W. G. ODATEY.
FLY CATCHER.
APPLICATION FILED FEB. 25, 1910.
970,944.
Patented Sept. 20, 1910.
2 SHEETS—SHEET 2.
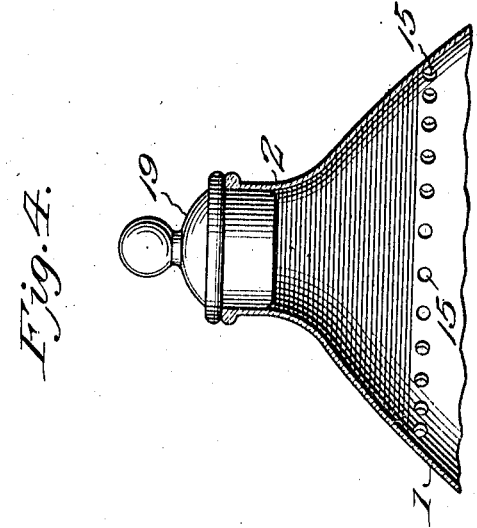
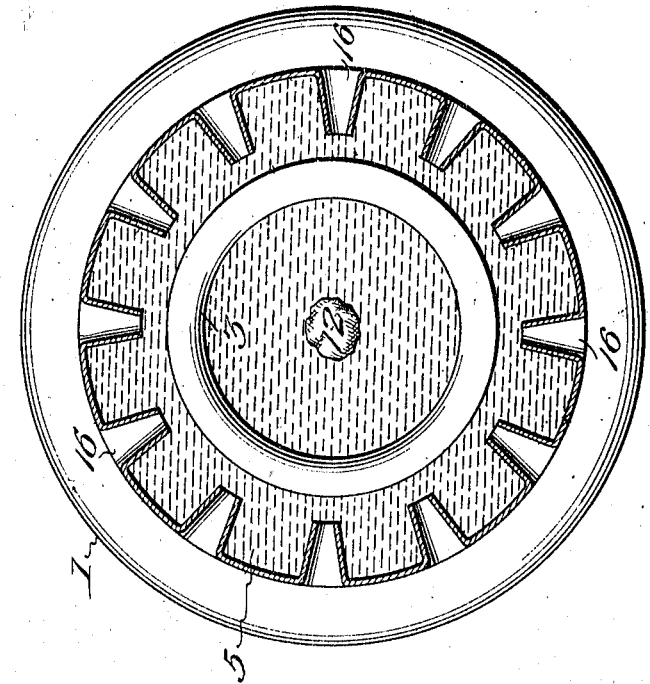
Witnesses
Edwin F. McKee
F. Allen
Inventor
William G. Odatey
By Victor J. Evans
Attorney

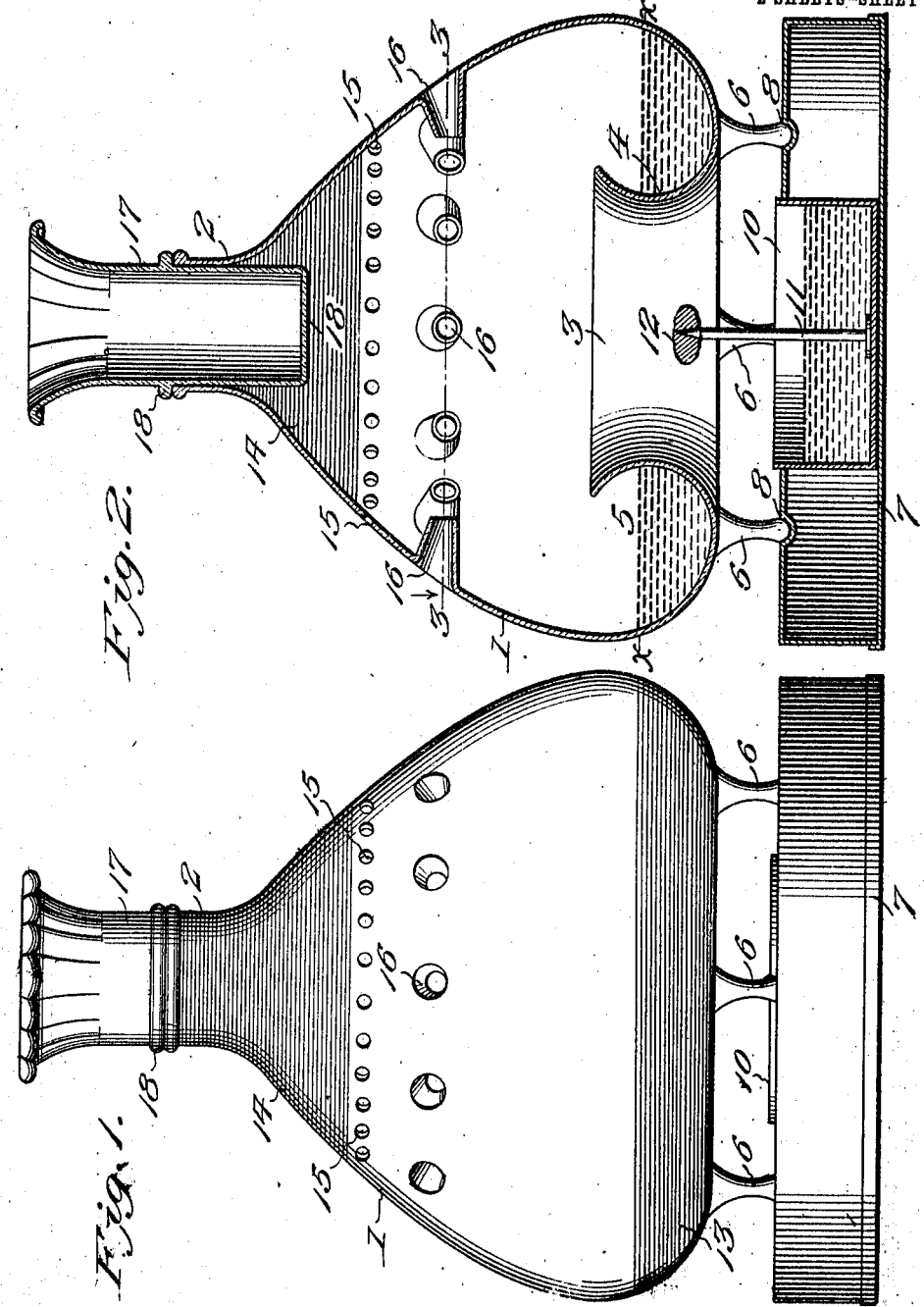

UNITED STATES PATENT OFFICE.

WILLIAM GORO. ODATEY, OF LOS ANGELES, CALIFORNIA.

FLY-CATCHER.

970,944.  Specification of Letters Patent.  Patented Sept. 20, 1910.

Application filed February 25, 1910. Serial No. 545,934.

*To all whom it may concern:*

Be it known that I, WILLIAM GORO. ODATEY, a subject of the Emperor of Japan, residing at Los Angeles, in the county of Los Angeles and State of California, have invented new and useful Improvements in Fly-Catchers, of which the following is a specification.

This invention relates to fly traps, the object of the invention being to provide a device of this character which will be effective in use in enticing and trapping flies, present a neat and ornamental appearance, and at the same time conceal the flies after they have been entrapped and destroyed, a further object being to provide a trap which may be readily cleaned and may be also used to form a flower holder.

The invention consists of the features of construction, combination and arrangement of parts hereinafter fully described and claimed, reference being had to the accompanying drawings, in which:—

Figure 1 is a side view of a fly trap embodying my invention. Fig. 2 is a central vertical section of the same. Fig. 3 is a horizontal section on the line 3—3 of Fig. 1. Fig. 4 is a detail vertical section showing the use of an ordinary form of stopper as a closure.

Referring to the drawings, 1 designates the body of the trap proper comprising a bottle-shaped receptacle, preferably formed of glass or other suitable transparent material. This receptacle is preferably widest at the base and tapers toward its upper end, where it is provided with a neck 2 forming an inlet for the introduction of an insecticide, as hereinafter described. The bottom of the trap is provided with a tubular projection 3 extending upwardly therefrom a distance into the receptacle, said projection having its intermediate portion concaved, as at 4, to provide a surrounding channel 5 to receive a liquid insecticide up to the level indicated by the line $x$—$x$, which insecticide is introduced through the neck 2 in any suitable manner and may consist of vinegar and water, Cayenne pepper and water or any other liquid substance destructive to flies.

The passage formed by the tubular projection 5 serves as an entranceway into the body of the receptacle from below, said receptacle being preferably provided with depending legs 6 to support it in an elevated position upon a stand 7 having recesses 8 to receive the lower ends of the legs. The stand is provided with a central cavity 9 receiving a removable pan or dish 10, in which may also be placed an insecticide solution to destroy the flies which fail to enter the receptacle 1 or which should drop down through the passage in the tubular projection. Fixed to and projecting upwardly from the pan 10 is a stem or standard 11 which enters the lower end of the tubular projection and on the upper extremity of which may be placed a particle of soft candy 12 serving as a bait to entice the flies into the receptacle.

In order to conceal the insecticide solution in the trough or channel 5, the lower portion of the vessel 1 is provided with an opaque ornamental band, finish or portion 13, up to the line $x$—$x$, while to enhance the attractiveness of the trap and reflect the light downward toward the tubular projection the upper portion of the vessel is also provided with an opaque ornamentation or finish 14. An annular series of air holes 15 are provided at the base of the ornamented portion 14 for ventilation purposes, and below these openings is disposed an annular series of spaced fly inlets 16 extending at an angle through the wall of the receptacle said inlets being of frusto-conical form so as to converge or decrease in area inwardly to allow the flies to freely enter and deter their escape. By the described arrangement of the opaque portions, the central or body portion of the trap alone is transparent for the passage of light, thus increasing the intensity of the light through the fly inlets to lure the flies into the receptacle. The neck 2 may be closed by a hollow stopper 17 having a bottom wall 18 and a fluted or ornamental upper portion and which is adapted to serve as a vase or holder for flowers, by which the appearance of the device will be enhanced when placed upon a table or other article of furniture in an apartment. The holder 17 is provided with a flange or shoulder 18 to rest upon the rim of the neck and support it in position. In lieu of the holder an ordinary form of stopper 19 may be provided to close the neck, as shown in Fig. 4. The liquid insecticide contained in the channel or trough 5 may be perfumed so as to attract the flies and cause them to enter through the tubular projection and opening 16. The flies circulating in the trap will finally come in contact with the insecticide and be destroyed, while those which drop back through the tubular projection will fall into the insecticide solution in the dish 10 and be destroyed.

It will be observed that the device is ornamental in appearance and that, by the provision of the opaque lower portion, the dead flies in the channel or trough will be concealed, so that the device will not be objectionable to those in the vicinity of the trap. Upon removing the stopper or closure, the contents of the trap may be discharged and the interior of the trap cleansed for further use.

Having thus described my invention, what I claim, is:—

1. A fly trap embodying a base, a vessel having its bottom disposed in spaced relation to the base and formed with an upstanding tubular projection providing a fly inlet and a surrounding insecticide trough, an insecticide containing vessel supported by the base below the first-named vessel, and a bait supporting element extending upwardly from the second-named vessel into said tubular projection.

2. A fly trap embodying a base having a cavity therein, a vessel provided with supporting legs resting upon the base and having its bottom formed with an upstanding tubular projection providing a fly inlet and a surrounding insecticide trough, a vessel adapted to be placed in said cavity in the base, and a bait supporting element extending upward from said vessel into said tubular projection.

In testimony whereof I affix my signature in presence of two witnesses.

WM. GORO. ODATEY.

Witnesses:
C. PRUDENCE WILLIAMS,
BIDNEY DORRELL.